Atterbury, Reddick & Atterbury.
Moulds for Glass Ware.
No. 34555. Patented Mar. 4, 1862.
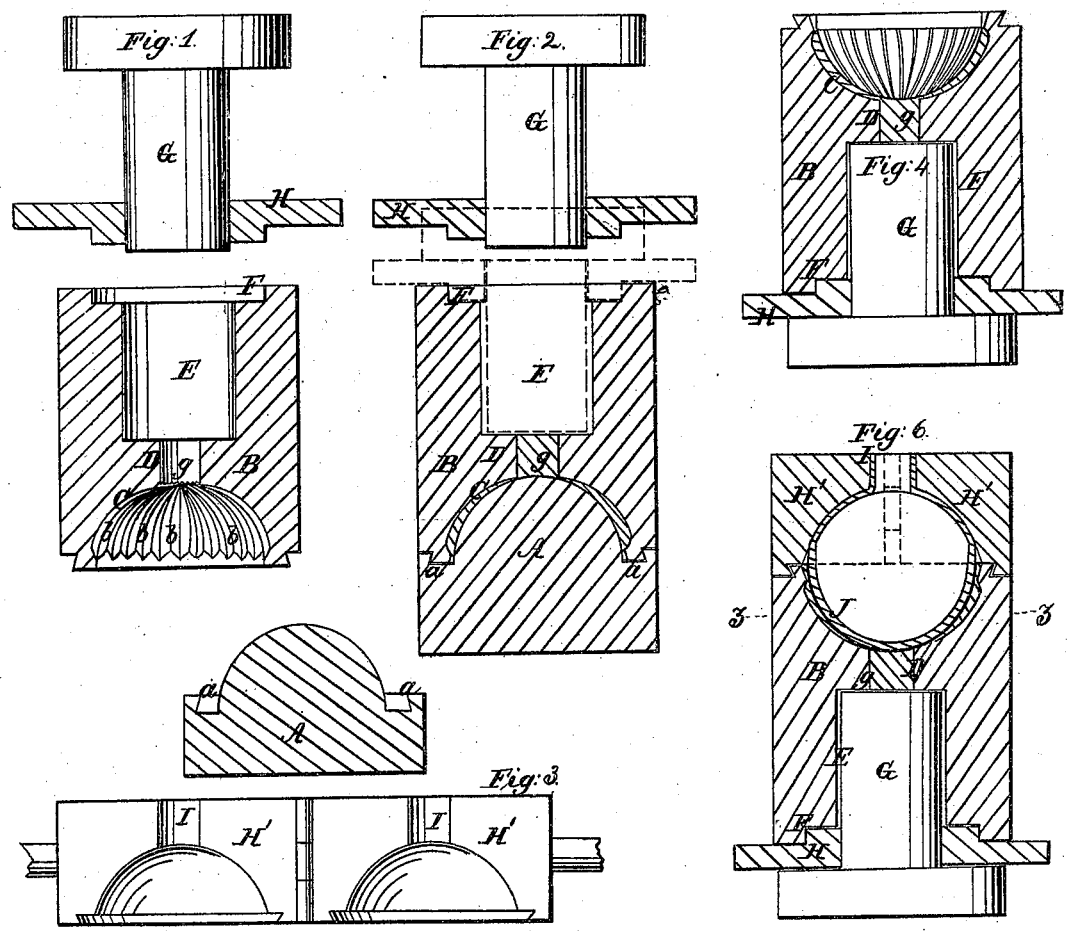
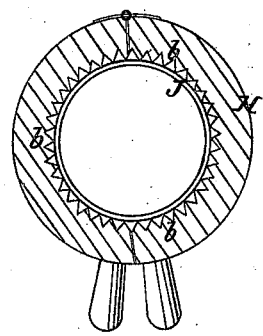
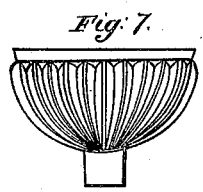
Witnesses:
Gustavus Dieterich
Inventor:
J. S. Atterbury
J. J. Reddick
T. B. Atterbury
by Mason, Fenwick & Lawrence

UNITED STATES PATENT OFFICE.

J. S. ATTERBURY, JAMES REDDICK, AND T. B. ATTERBURY, OF PITTSBURG, PENNSYLVANIA.

IMPROVEMENT IN MOLDS FOR GLASSWARE.

Specification forming part of Letters Patent No. 34,555, dated March 4, 1862.

*To all whom it may concern:*

Be it known that we, J. S. ATTERBURY, JAMES REDDICK, and T. B. ATTERBURY, of Pittsburg, in the county of Allegheny and State of Pennsylvania, have invented a new and useful Improvement in Molds for Molding Glassware in Bas-Relief; and we do hereby declare that the following is a full, clear, and exact description of the same, reference being had to the accompanying drawings, forming part of this specification, in which—

Figure 1 is a section of those parts of the mold which are used in producing the bas-relief work. Fig. 2 is a similar section of the same parts as they appear relatively to one another when the work is produced. Fig. 3 is a horizontal section of Fig. 6 in line $z\,z$. Fig. 4 is a vertical section of the whole mold shown in Fig. 2, (excepting the base-piece,) the same having been inverted with the bas-relief work within it. Fig. 5 is an open view or interior view of an upper hinged section of the mold. Fig. 6 is a vertical section of the mold, shown in Figs. 4 and 5 united, and with a glass lamp blown in it within the bas-relief work. Fig. 7 is a side elevation of the bas-relief work as produced in the mold, and before the lamp is blown within it.

The same letters of reference in the several figures indicate corresponding parts.

The object of our invention is to press open-work figures—such as flowers, shells, net-work, and geometrical figures—in any colored glass, and then unite the same (so as to have them stand in bas-relief) to various descriptions of glassware.

To enable others skilled in the art to make and use our invention, we will proceed to describe the same.

A is a base-plate with a projection of spherical form extending up from its top. The projection is of less diameter than the plate in order that a grooved ledge $a$ for the reception and support of another part shall extend out beyond the projection. The projection serves the office of a core in the molding of concave skeleton work.

B is the section of mold in which the bas-relief design is engraved or wrought. The design shown is that of prismatic ribs $b$, on the surface of a semi-spherical recess C, formed in the lower portion of section B.

The section of mold B is cylindrical and made in two parts, which open on a hinge. Just above the recess C a partition D is formed, through which an orifice $g$ extends down to the recess C. Above the partition the interior of the mold-section B is cylindrical, as shown at E, the said hollow cylindrical portion extending up to or near the top of section B, and there enlarging in diameter to a considerable extent, as shown at F, so as to form a shallow shoulder, for a purpose presently described. The section B thus constructed is fitted over the core A when it is desired to mold the major or lower part of the lamp-peg.

G is a plunger, with a steadying-follower H encircling it. This plunger, with follower, just fits the hollow cylindrical portion E E, and descends into the same when the molding operation is progressing.

H' is the upper section of the mold, made in two parts and opening on a hinge. This section has a spherical interior recess formed in its two parts and a cylindrical orifice I in its top. The section H' is used in the last stage of the operation of making the lamp peg or bowl, and its office is to give form to the upper part of the article being produced with bas-relief work on its outer surface.

The operation or process of making the article, whatever it may be, or the character of the design or bas-relief work of its outer surface, is substantially as follows: The core or base-plate A is placed in the press. The section B of mold is then arranged over the core of the base-plate, as shown in Fig. 2. The plunger G, with follower H, being in position shown in black lines in said figure, the melted glass of red color is introduced into the chamber E of section B of the mold, and immediately thereafter the plunger is pressed down into said chamber and the melted glass pressed down through the orifice $g$ into the prisms $b$ of the recess C, as illustrated by red tinting and red outlines in Fig. 2. The section B of mold, with bas-relief work molded in it and with the plunger and steadying-follower in the position shown in red outlines is inverted, as shown in Fig. 4. The workman then gathers sufficient glass on the end of his blow-pipe and forms it into suitable shape to blow a lamp-bowl or "peg." This ready, the top section H' of mold is arranged on top of the section B, as shown in Fig. 6; but before closing the hinged parts of said top section the glass gathered on the end of the blow-pipe is put down on the inside of the skeleton shell or hollow semi-sphere of prisms. This done, the top section of mold is closed and the workman blows through the orifice and forms out of the lump of glass which was laid on the inner surface of the prisms a flint or other glass bowl or peg J, as shown in Fig. 6, the prisms standing in bas-relief on the outside of the bowl or peg, and by their illuminated color produce a very handsome effect upon the flint-glass lamp bowl or peg.

We have described and shown but one style of article and of bas-relief work; but it is obvious that by making changes in the shape of the sections of mold and in the design or ornaments, and still following the plan of operation just described, a great variety of articles with differing ornamental appearance can be produced.

What we claim as our invention, and desire to secure by Letters Patent, is—

1. The means and manner, substantially as herein described, of pressing articles of glassware in bas-relief.

2. The means and manner of uniting the bas-relief glass-work to the outer surface of blown glassware, substantially as herein described.

J. S. ATTERBURY.
JAS. REDDICK.
T. B. ATTERBURY.

Witnesses:
JOHN C. STEVENSON,
A. B. STEVENSON.